United States Patent [19]

Sanford et al.

[11] Patent Number: 4,925,263
[45] Date of Patent: May 15, 1990

[54] PROTON-EXCHANGED WAVEGUIDES FOR SUM-FREQUENCY GENERATION

[75] Inventors: Norman A. Sanford, Stillriver; James M. Connors, Buzzards Bay, both of Mass.

[73] Assignee: Polaroid Corporation, Cambridge, Mass.

[21] Appl. No.: 273,058

[22] Filed: Nov. 17, 1988

Related U.S. Application Data

[63] Continuation of Ser. No. 117,624, Nov. 5, 1987, abandoned.

[51] Int. Cl.$^5$ .................................................. G02B 6/10
[52] U.S. Cl. ................................... 350/96.12; 372/21; 307/425
[58] Field of Search ........................... 350/96.11–96.15, 350/96.29, 96.24; 372/21; 307/425–430

[56] References Cited

U.S. PATENT DOCUMENTS

| 4,290,668 | 9/1981 | Ellis et al. | 350/96.20 |
| 4,331,891 | 5/1982 | Rizzo | 307/425 |
| 4,695,121 | 9/1987 | Mahapatra et al. | 350/96.12 |
| 4,705,346 | 11/1987 | Miyawaki | 350/96.12 |

OTHER PUBLICATIONS

Tien et al., "Optical Second Harmonic Generation in the Form of Coherent Cerenkov Radiation of a Thin Film Waveguide", Appl. Phys. Ltt., vol. 17, No. 10, Dec. 15, 1970.
Taniuchi et al., "Second Harm. Generation by Cerenkov Rad. in Proton-Exc., LiNbO$_3$ Opt. Waveguide", Cleo/1986.
Korotky, "Opt. Waveguide", Cleo/1987.

Primary Examiner—Léon Scott, Jr.
Attorney, Agent, or Firm—Francis J. Caufield

[57] ABSTRACT

Optimal sum-frequency and second harmonic generators are fabricated in ferroelectric waveguides by taking into account the interference between generated beams of Cerenkov radiation.

12 Claims, 6 Drawing Sheets

PROTON-EXCHANGED WAVEGUIDES FOR SUM-FREQUENCY GENERATION

CROSS-REFERENCE TO RELATED APPLICATION

This is a continuation of application Ser. No. 117,624, filed Nov. 5, 1987, now abandoned.

BACKGROUND OF THE INVENTION

1. Field of the Invention

The present invention pertains to ferroelectric channel waveguides for use in providing optical sum-frequency generation and to at least one method for fabricating efficient ferroelectric channel waveguides for such use.

2. Description of the Prior Art

It is well-known that certain classes of optical crystals have dielectric properties responsible for nonlinear responses in the crystals in the presence of appropriate optical fields. The nonlinear responses can manifest themselves as exchanges of energy between fields of different frequency. Of this type, two of the more important nonlinear responses are second harmonic generation in which part of the energy of an optical wave propagating in a crystal is converted to a wave of twice the frequency of the original and sum-frequency generation in which a strong pump at one frequency can produce radiation at two other frequencies whose sum equals that of the pump frequency or in which two or more pumps of different frequency will produce, in addition to their individual second harmonics, optical frequencies equal to the sum of the two.

Recently, much activity has taken place in the field of second harmonic generation in $LiNbO_3$ channel waveguides. One reason for this activity is the desire to produce a miniaturized light source of coherent radiation at small wavelengths, for example, to produce a coherent source of blue light. Specifically, an abstract entitled "Miniaturized Light Source Of Coherent Blue Radiation" by T. Taniuchi and K. Yamamoto, published as abstract WP6 in the conference proceedings of the *Conference on Lasers and Electro Optics (CLEO)* sponsored by the Optical Society of America, Washington, D.C., 1987, discloses the frequency doubling of 0.84 um laser radiation in a proton-exchanged $LiNbO_3$ waveguide at room temperature. The abstract discloses the following features of the apparatus: (1) frequency doubling of the laser diode radiation is achieved by using a Cerenkov radiation scheme in the proton-exchanged $LiNbO_3$ waveguide; (2) the proton-exchanged $LiNbO_3$ waveguide is advantageous because it has a high resistance to optical damage; and (3) the Cerenkov radiation scheme automatically provides phase matching between a guided mode of the fundamental wave and a radiation mode of the harmonic wave because the spectrum of the radiation mode is continuous. The disclosed waveguide was fabricated by proton-exchange using pyrophosphoric acid ($H_4P_2O_7$) as a proton source. At room temperature, a spinner was used to coat the acid on the surface of a z-cut $LiNbO_3$ substrate having a tantalum mask, and the substrate was then heated at 230° C. As a result, the extraordinary refractive index was raised by about 0.145 at a wavelength of 0.63 um add had a step-index profile. The waveguide was formed for propagation in the y-direction on the substrate and was 2 micrometers wide, 0.47 micrometers deep, and 6 mm long. The abstract discloses that the output from a high-power GaAlAs laser diode having a wavelength output at 0.84 um and an output power maximum at 120 mW passed through a half-wave plate and was then coupled into one end of the waveguide by a focusing lens having a numerical aperture (NA) equal to 0.6. The half-wave plate changed the polarization direction of the laser output to provide coupling to a TM-guided mode. The abstract further discloses that a maximum output power of 1.05 mW at 0.42 micrometers was achieved for a fundamental pump power of 120 mW and that the total power coupled into the waveguide was 65 mW.

Further, an abstract entitled "Second Harmonic Generation By Cerenkov Radiation In Proton-Exchanged $LiNbO_3$ Optical Waveguide" by T. Taniuchi, K. Yamamoto, and Y. Fujii, published as abstract WR3 in the conference proceedings of the *Conference on Lasers and Electro Optics (CLEO)* sponsored by the Optical Society of America, Washington, D.C., 1986, discloses second harmonic generation by Cerenkov radiation in a proton-exchanged $LiNbO_3$ waveguide by automatic phase matching between a fundamental guide mode and the continuous spectrum of the radiation mode of a second harmonic wave. The abstract discloses coupling 1.06 micrometer radiation output from a cw Nd:YAG laser into one end of the waveguide via a 40X microscope objective. Further, the abstract discloses that the output power of the second harmonic is proportional to the square of the pump power which was coupled into the waveguide and that a maximum conversion efficiency from pump radiation to second harmonic radiation was achieved when the waveguide width was 2.5 micrometers, the waveguide thickness was 0.55 micrometers and the waveguide length was 6 mm. Still further, the abstract notes that the apparatus could serve as a practical coherent light source for laser printer applications in the green and blue wavelength region.

Lastly, an abstract entitled "New Proton-Exchange Technique For $LiNbO_3$ WaveGuide Fabrication" by K. Yamamoto and T. Taniuchi, published as abstract TUH2 in the conference proceedings of the *6th International Conference on Integrated Optics and Optical Fiber Communication (OFC/IOOC)* '87, sponsored by the Optical Society of America, Washington, D.C., 1987, discloses a method for fabricating a proton-exchanged waveguide in $LiNbO_3$ by using pyrophosphoric acid as a proton source. The abstract discloses that pyrophosphoric acid was chosen as a proton source primarily because it is a liquid at room temperature and because it has a high coefficient of viscosity. The high coefficient of viscosity allows pyrophoshoric acid to be coated on the surface of a $LiNbO_3$ substrate. Further, because of its high proton concentration compared to that of benzoic acid, it can be used to form a high-index waveguide. Stripes were fabricated using a conventional photolithographic technique. In particular, a tantalum (Ta) mask was used because pyrophosphoric acid attacked other metals. The Ta mask was patterned by $CF_4$ reactive ion etching; pyrophosphoric acid was then coated on the z face of $LiNbO_3$ substrates using a spinner at 300 rpm for 40 seconds; and the substrates were then baked in a pyrex tube at temperatures ranging from 150°–280° with diffusion times varying from 5 minutes to 6 hours. After the exchange process, the substrates were washed in ionized water to remove excess pyrophosphoric acid.

As one will readily appreciate from the activity discussed above, a coherent blue and/or green light source is desired and, in particular, for use, in laser printer applications. Further, proton-exchanged LiNbO$_3$ channel waveguides appear to provide a potential structure for use in producing such sources of radiation. However, the efficiencies that have been achieved in the prior art are not sufficient to provide a practical device which can efficiently operate in a commercial environment.

Consequently, it is a primary object of the present invention to advantageously solve the above-described problems in the prior art by providing a high-efficiency source of optical sum-frequency radiation in ferroelectric channel waveguides and, in particular, for producing second harmonic radiation therefrom.

SUMMARY OF THE INVENTION

The present invention preferably comprises proton-exchanged LiNbO$_3$ waveguides fabricated to support substantially a single mode of input pump radiation, having a width which is sufficiently large to guide substantially all of the radiation in the single mode guided pump wave, and having a depth that maximizes the phase matching between two sum-frequency generated Cerenkov beams produced in the apparatus where one of the Cerenkov beams propagates out of the waveguide into the LiNbO$_3$ substrate and the other Cerenkov beam propagates out of the waveguide and is internally reflected from an interface between the waveguide and the air.

It has been found that sum-frequency generation and, in particular, second harmonic wave generation is strongly dependent on the interference between the above-described Cerenkov beams of radiation. Further, we have determined that the sum-frequency power output has a strongly peaked behavior which is particularly sensitive to changes in waveguide depth. Still further, we have determined that the peaks also vary as a function of pump wavelength, i.e., the positions of the peaks as a function of waveguide depth tend to shift to larger depths as the pump wavelength shifts to longer wavelengths. For these reasons, care must be exercised to properly account for these interference effects when designing a device because a relatively small variation in depth can produce a relatively inefficient device. Advantageously, the present invention provides those of ordinary skill in the art with a method of determining how to produce an efficient device for sum-frequency generation and, in particular, for second harmonic generation.

Examples of a method of the present invention that may be used to determine a diffusion time which produces a waveguide having a depth which maximizes the phasematching between the Cerenkov beams are disclosed.

Further, we have determined that preferred embodiments of the inventive apparatus are fabricated on the +z face of z-cut LiNbO$_3$ substrates but, if necessary, the −z face can be usefully employed with suitable adjustments in fabrication techniques.

BRIEF DESCRIPTION OF THE DRAWINGS

The principles of the present invention may be clearly understood by considering the following detailed description in conjunction with the accompanying drawing, in which.

To facilitate understanding, identical reference numerals have been used to denote identical elements common to the figures.

DETAILED DESCRIPTION

Figure 1:
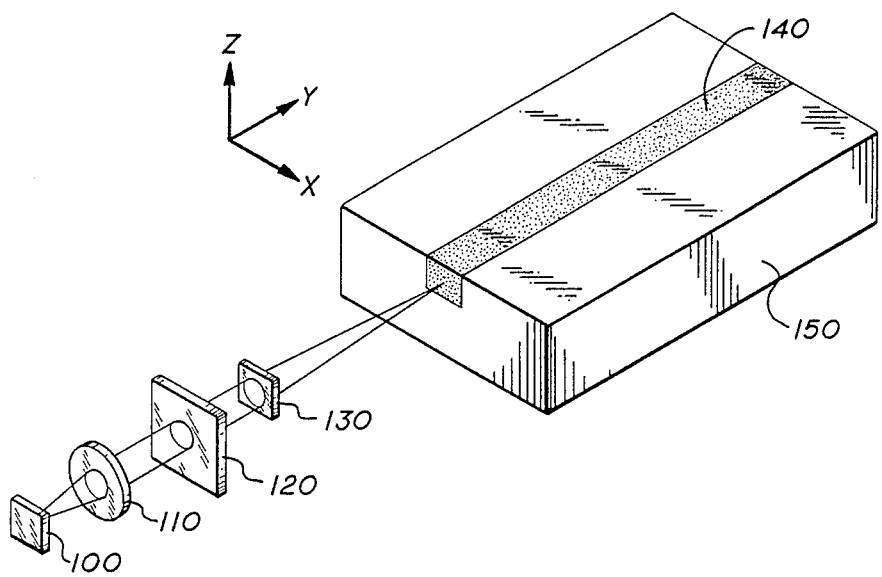
FIG. 1 shows, in pictorial form, an embodiment of the present invention.

FIG. 1 shows, in pictorial form, an apparatus fabricated in accordance with the present invention to provide second harmonic wave generation. Laser source 100 is a laser diode source emitting radiation, for example, at 840 nm and/or 800 nm. It is well-known in the art that GaAlAs laser diodes are available for providing laser radiation at such wavelengths. The radiation output from laser source 100 is collected by a lens 110 and is directed thereby to impinge upon a half-wave plate 120. Half-wave plate 120 rotates the plane of polarization of the laser radiation to the y-direction. The radiation output from half-wave plate 120 impinges upon a focusing microscope objective 130, and microscope objective 130 focuses the radiation on or into the end of a proton-exchanged channel waveguide 140 disposed on the +z face of a z-cut LiNbO$_3$ substrate 150. As is well known in the art, because waveguide 140 is a proton-exchanged waveguide, it preferentially supports TM guided modes having a polarization aligned along the z-axis.

As shown in FIG. 1, the z-axis is perpendicular to the surface of substrate 150, the y axis is directed along substrate 150 and the x-axis is directed across substrate 150. Further, waveguide 140 is disposed parallel to the y-axis but could be some outer mediate angle between the x-y axis. Cerenkov second harmonic and sum-frequency radiation propagated in waveguide 140 is forward radiated at a shallow angle from waveguide 140 into substrate 150. The radiation exits the output facet of substrate 150 and appears as bright bands in the far field.

Waveguide 140 is fabricated to have a width and a depth which preferably support only a single mode or which support at most two modes with the TM$_{00}$ mode dominating at a given width. As will be discussed in detail below, a typical width is substantially in the range between 1 micrometers to 3 micrometers. This is done to provide a large intensity for the pump radiation which is coupled into waveguide 140 from laser source 100. When the inventive apparatus is used, as shown in FIG. 1, to generate coherent second harmonic radiation, the efficiency of the second harmonic generation depends, at least in part, on the square of the power of the pump radiation coupled into waveguide 140. Further, when the inventive apparatus is used to generate coherent sum-frequency radiation and waveguide 140 is pumped with radiation from two lasers simultaneously, the efficiency of sum-frequency generation depends, at least in part, on the product of the power of the radiation coupled into waveguide 140 from the two lasers.

When radiation having frequencies at $w_1$ and $w_2$ is coupled into a waveguide, in accordance with sum-frequency generation, one produces a time varying polarization which has frequency components: $w = w_1$, $w_2$, $2w_1$, $2w_2$, and $w_1 + w_2$. The modes propagating in the waveguide at frequencies $w_1$ and $w_2$ are referred to as "pump modes" or "pump waves." The sum-frequency polarizations at $2w_1$ and $2w_2$ are responsible for second harmonic generation due separately to sources 1 and 2. The sum-frequency polarization at $w_1 + w_2$ will produce radiation at a wavelength, $L_{sum}$, which is intermediate the two second harmonics just discussed and is given by the equation:

$$1/L_{sum} = 1L/_1 + 1/L_2 \quad (1)$$

where $L_1$ is the wavelength of the radiation at frequency $w_1$ and $L_2$ is the wavelength of the radiation at frequency $w_2$.

Figure 2:
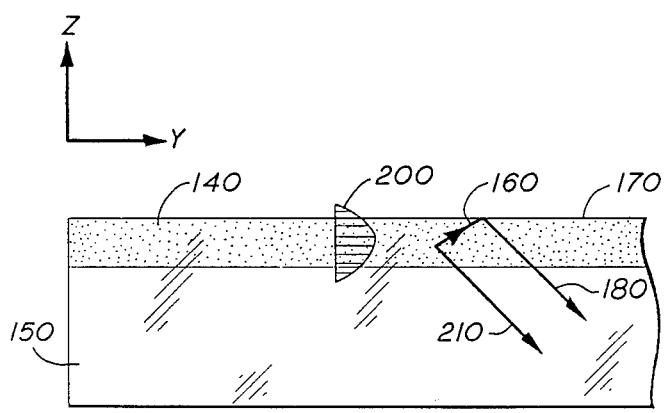
FIG. 2 shows, in pictorial form, the waves which are formed in an inventive waveguide used for second harmonic generation.

FIG. 2 shows the light waves which are generated when pump light propagates in waveguide 140 to form sum-frequency waves and, in particular, second harmonic waves. Curve 200 represents the intensity waveguide 140. As shown, a small portion of energy from the pump wave propagates into the air above waveguide 140, a substantial portion of energy from the pump wave is contained within waveguide 140, and a portion of energy from the pump wave propagates into substrate 150 below waveguide 140. The sum-frequency waves, which are second harmonic waves in this case, become radiation modes which radiate away from the axis of waveguide 140, i.e., the y axis, at the Cerenkov angle. Note, for air-loaded waveguide 140 shown in FIG. 2, component 160 of the sum-frequency radiation which is radiated in the z-direction, toward air interface 170, suffers total internal reflection. Internally reflected wave 180 then exits waveguide 140 along with wave 210 which originally radiated in that direction. The Cerenkov radiation is composed of the radiation emitted along $-z$ and positive y. Waves 180 and 210 interfere to an extent which is dictated by the phase shift of internally reflected wave 180. Therefore, in accordance with the present invention, optimization of the power of the Cerenkov radiation depends upon maximizing not only the optical power density of the pump waves, for example, by providing single mode guides, but also, by insuring that the waveguide design permits an interference maximum between the Cerenkov beam 180 and 210.

In the following paragraphs, we will describe the considerations that lead to an optimal waveguide design for providing the preferred maximized interference in accordance with the present invention. However, some preliminary concepts which are necessary for a proper understanding of the present invention will first be discussed.

The proton-exchange process for forming waveguide 140 in LiNbO$_3$ substrate 150 increases the index of refraction of the extraordinary wave and lowers the index of refraction of the ordinary wave. In particular, for such processes, the increase in index which is achieved for the extraordinary wave is typically much greater than the decrease which is achieved for the ordinary wave. For that reason, one can treat the process of nonlinear mixing and sum-frequency generation in particular as being supported almost entirely by the extraordinary wave. Consequently, since the index of refraction of the extraordinary wave produces guided modes in waveguide 140 which are polarized along $n_e$, a z-cut substrate will primarily support TM$_{mn}$ modes. Further, it appears that the efficiency of producing Cerenkov radiation in z-cut LiNbO$_3$ is substantially greater than that for x-cut. For that reason, we prefer to fabricate the inventive apparatus on z-cut LiNbO$_3$ substrates.

In the following analysis, the width of waveguide 140 is determined by the consideration that only a small amount of light propagating in a pump mode should be well confined along the x-axis. The width of waveguide 140, i.e., the extent of waveguide 140 along the x-axis, will be referred to as $w_g$ and typical widths are substantially in the range of 1 to 3 microns. The horizontal confinement imposed by the typical three micron width of the waveguide permits Cerenkov radiation to be generated in the horizontal plane, i.e., the x-y plane as shown in FIG. 1. However, since the confinement in that width direction is substantially less than the confinement in the depth direction, the Cerenkov radiation emitted in that plane is relatively insignificant compared with the Cerenkov radiation radiated straight into the depth as shown in FIG. 2.

The depth of waveguide 140 will be referred to as $d_g$ and should be chosen, initially, to be sufficiently small that end-fired radiation, as is shown in FIG. 1, will be substantially coupled into a single mode. If the depth is kept reasonably small so as to form a shallow waveguide, only one mode or, at most, two modes will be supported, a TM$_{oo}$ being preferred. Note, however, as depth $d_g$ of waveguide 140 becomes increasingly smaller, the Cerenkov angle of waves 160 and 210 in FIG. 2 also becomes increasingly larger. In fact, at a predetermined waveguide depth, waves 160 and 210 actually vanish for certain wavelengths.

We have analyzed Maxwell's equations for the wave picture and structure shown in FIG. 2. As a result of this analysis of sum-frequency wave generation which has second harmonic generation as one example thereof, we have determined that the amplitude of the power of the second harmonic waves generated as Cerenkov radiation is proportional to the following:

$$(y_o/w_g d_g^2)(d_{33}P_g)^2 A_f \quad (2)$$

where $y_o$ is the length of waveguide 140 along the y-axis, $w_g$ is the width of waveguide 140, $d_g$ is the depth of waveguide 140, $d_{33}$ is the nonlinear optic coefficient effective in coupling the fundamental wave at frequency into a second harmonic polarization in 2, $P_g$ is the pump wave power carried in waveguide 140 at optical frequency, and $A_f$ is an amplitude function which results from the analysis of the interference between the various Cerenkov beams propagating in the structure and is expressed in terms of waveguide geometry and modal effective indices.

Eqn. (2) shows the following. First, as was previously understood in the prior art, the output power is proportional to the square of the pump power. Second, the output power is proportional to the length of waveguide 140. Third, the output power is inversely proportional to the width of waveguide 140 and inversely proportional to the square of the depth of waveguide 140.

FIGS. 4–7 are plots of the computed second harmonic radiation power output from a proton-exchanged LiNbO₃ waveguide as a function of waveguide depth for pump radiation having wavelengths equal to 0.80 micrometers, 0.87 micrometers, 0.95 micrometers, and 1.06 micrometers, respectively. FIGS. 4-7 have been generated for a waveguide having an extraordinary index difference between it and the substrate of approximately 0.1. Note the following. First, the second harmonic power has a strongly peaked output which is brought to light by properly accounting for interference effects. In accordance with the present invention, these interference effects must be taken into account in order to properly design a second harmonic or sum-frequency generation apparatus in proton-exchange LiNbO₃ waveguides in particular and in ferroelectric waveguides in general. Second, we have determined that the second harmonic power output is a strong function of waveguide depth. For example, FIGS. 4-7 show a strong peak at depths approximately equal to 0.35 micrometers, 0.40 micrometers, 0.50 micrometers and 0.55 micrometers for pump wavelengths equal to 0.80 micrometes, 0.87 micrometers, 0.95 micrometers and 1.06 micrometers, respectively.

Figure 4:
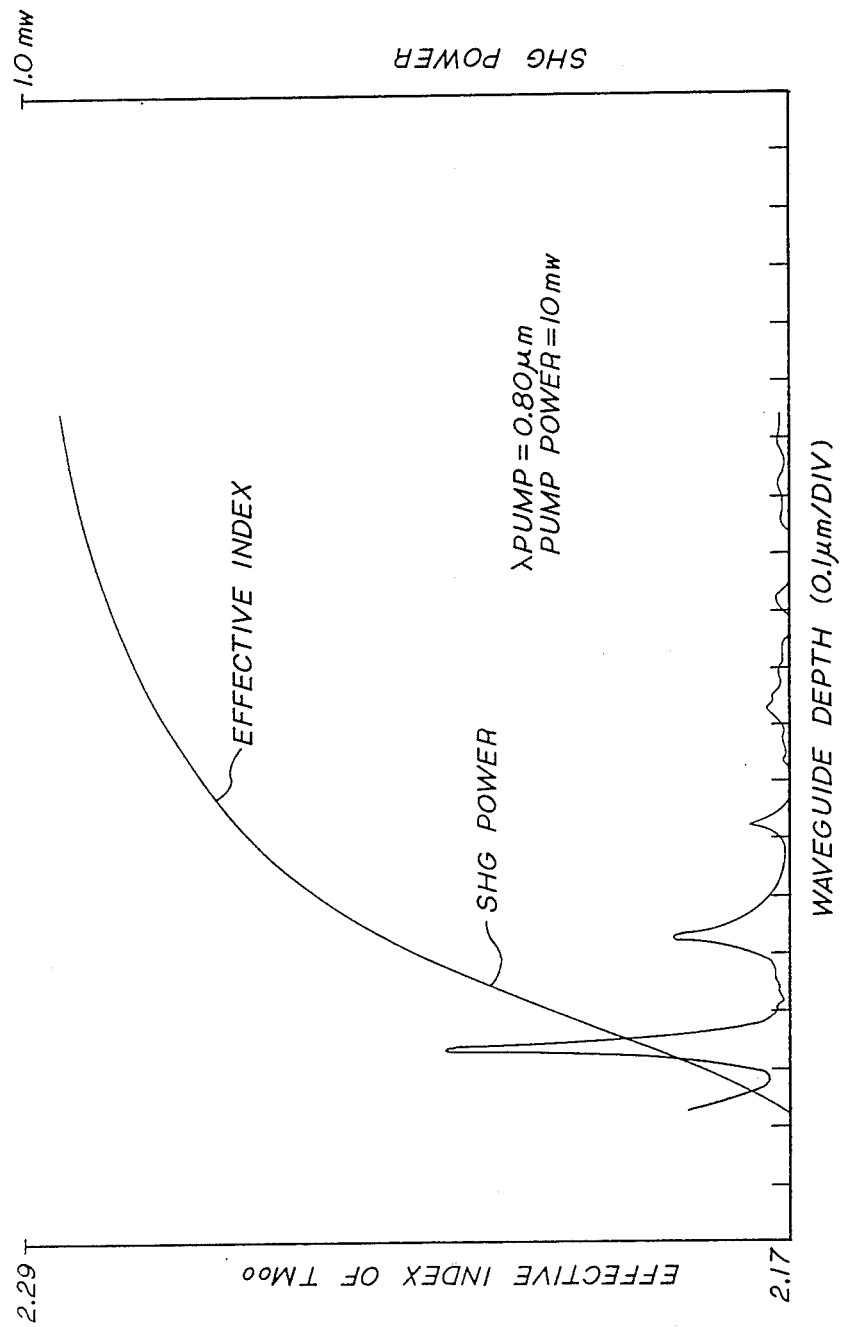
FIGS. 4–7 show plots of the approximate computed second harmonic radiation power output from a proton-exchanged LiNbO$_3$ waveguide as a function of waveguide depth for pump radiation having wavelengths equal to 0.80 micrometers, 0.87 micrometers, 0.95 micrometers, and 1.06 micrometers, respectively, the approximation fails at the cutoff depth of the pump mode and improves for effective indices of the pump mode away from cutoff.
Figure 5:
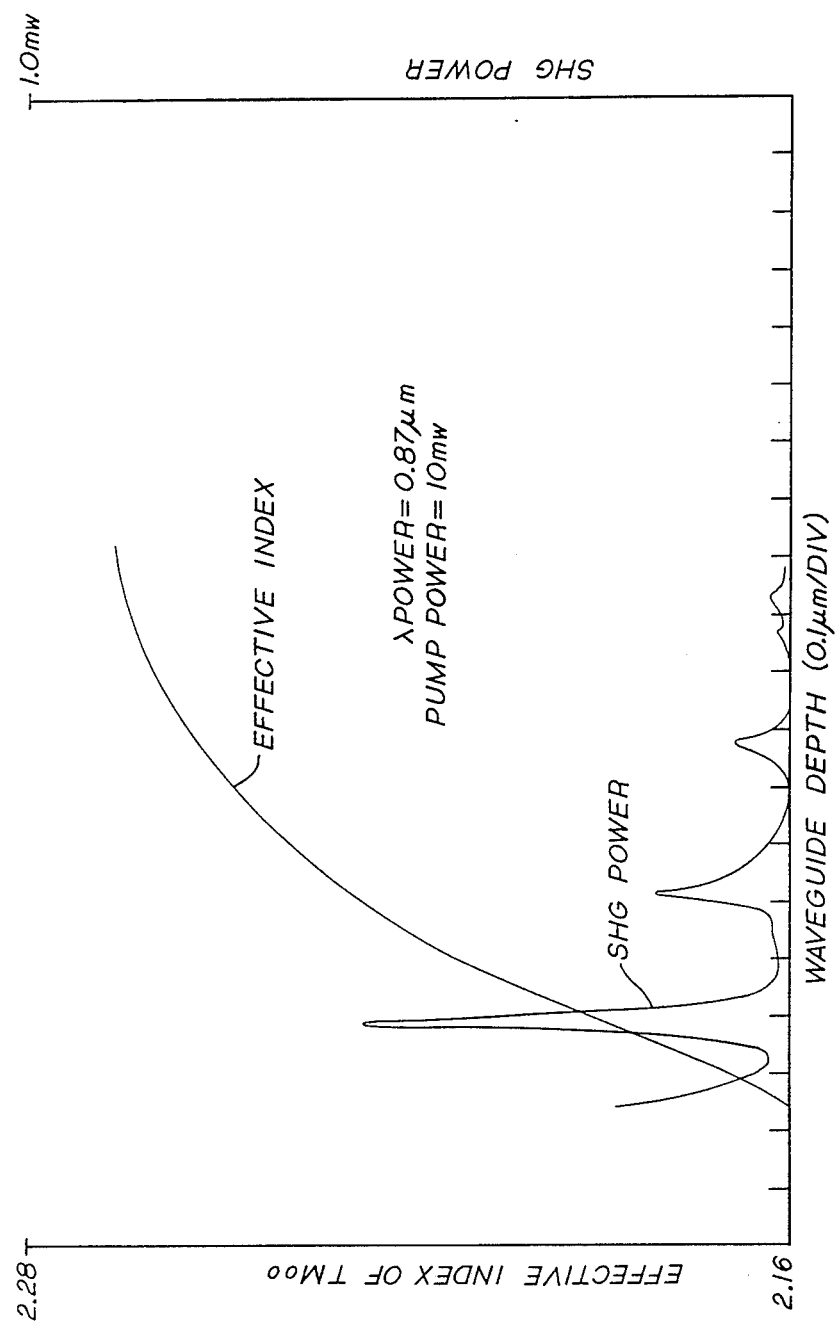
Figure 6:
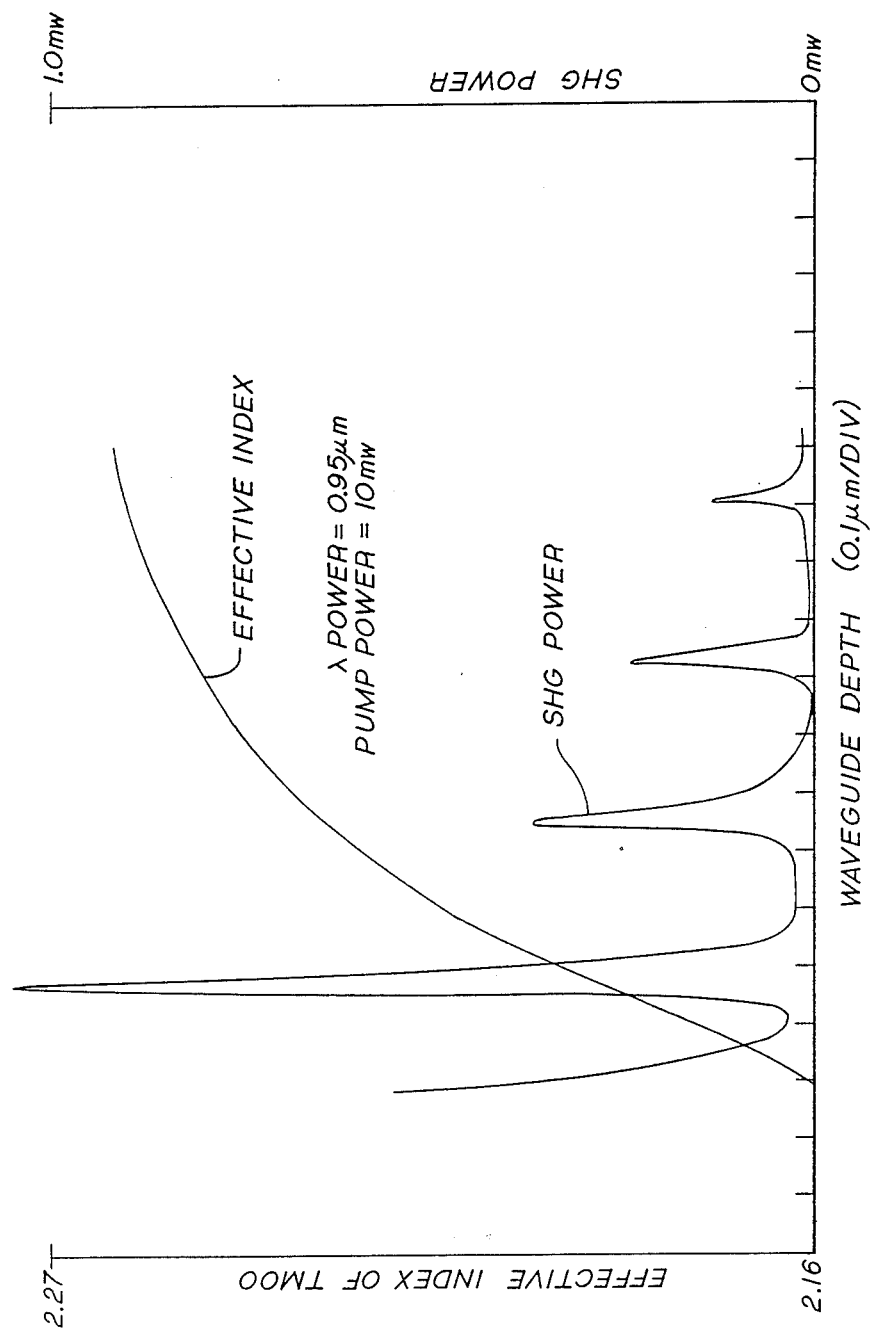
Figure 7:
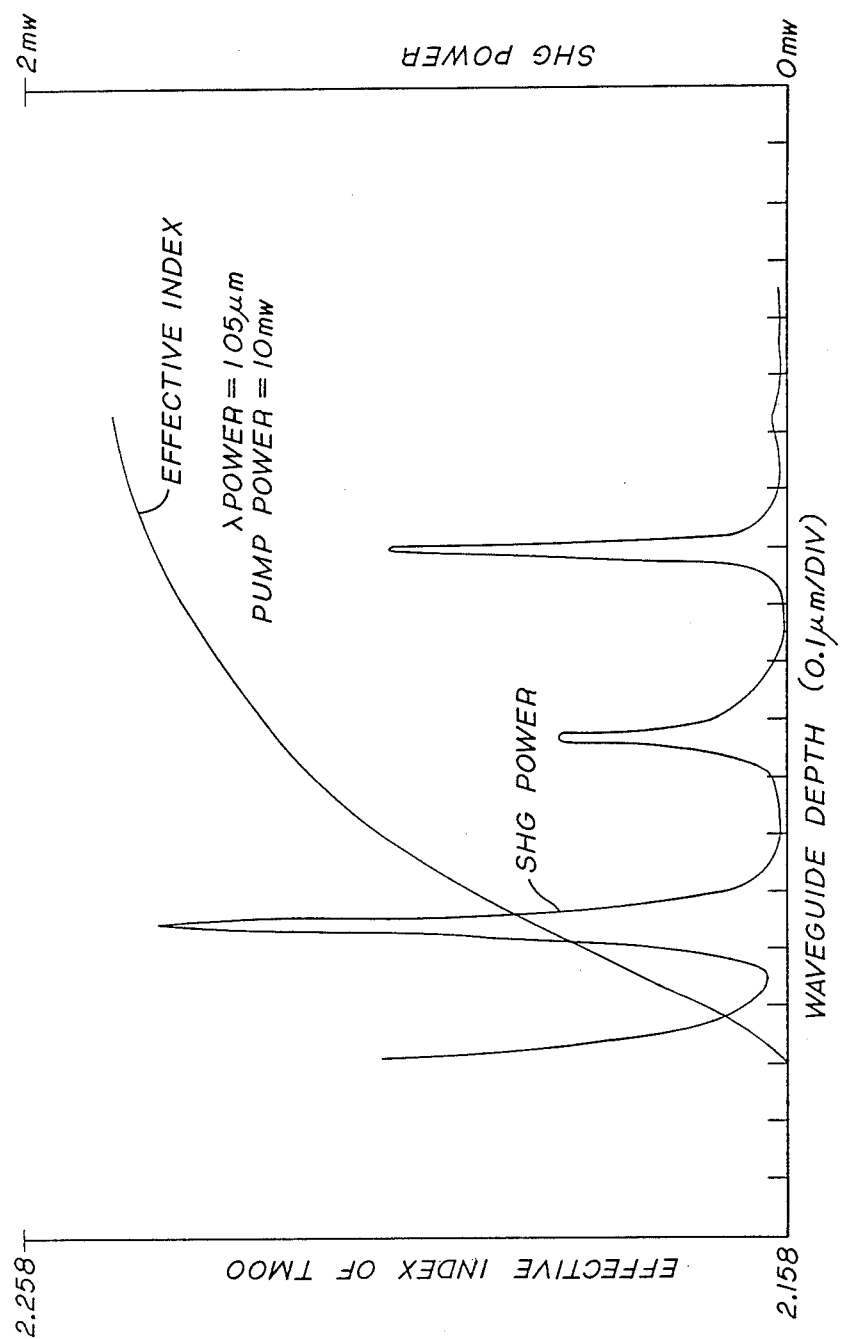

As one can readily appreciate from the above, one cannot properly design an efficient apparatus if the interference effects displayed in graphs of FIGS. 4-7 are not properly taken into account. For example, in the abstract WP6 described in the "Background of the Invention", the authors disclose their use of a waveguide having a 0.47 micrometers depth for pump radiation at 0.80 micrometers. An examination of FIG. 4 shows that this depth will produce a minimum of output power. Advantageously, using a waveguide fabricated in accordance with the present invention, we have been able to achieve an efficiency ten times that disclosed in the abstract.

We will now describe a preferred method for fabricating proton-exchanged LiNbO₃ waveguides in accordance with the present invention. First, as described above, the proton-exchange process increases the index of refraction of the extraordinary wave and lowers the index of refraction of the ordinary wave in such a fashion that the extraordinary index is increased substantially more than the ordinary index is lowered. We have determined that it is preferred to raise the extraordinary index as much as possible. For that reason, we prefer to achieve proton-exchange by means of an ion exchange using pyrophosphoric acid rather than by means of an ion exchange using benzoic acid because a larger index change is achieved by using pyrophosphoric acid.

Second, we have determined that it is substantially advantageous to fabricate proton-exchange waveguides on the +z face of z-cut LiNbO₃ substrates rather than fabricating the waveguide on the −z face as is regularly done in the prior art. For example, typical stock optical grade LiNbO₃ which is obtained from suppliers such as Crystal Technology Incorporated or Inrad for use in integrated optical applications is provided as a z-cut wafer having only the −z face optically polished. We have determined that waveguides formed on the +z face possibly have less residual stress and strain than do waveguides which are formed on the −z face. In addition, we have determined that more of the second harmonic scattering occurs for pump radiation when using waveguides formed on the +z face than when using waveguides formed on the −z face of the LiNbO₃ substrate. This is important because any scattering of pump radiation severely lowers the efficiency of second harmonic generation.

In particular, an inventive waveguide is formed by using tantalum as an acid mask to delineate the waveguides. The tantalum mask is formed by evaporating a 300-500 Angstrom tantalum film by an electron-beam evaporation process onto the +z face of a z-cut LiNbO₃ substrate. The tantalum film is reactive-ion etched to form diffusion apertures ranging in width along the x axis from 1 to 3 microns and running the entire length of the substrate, the length typically being 1 cm. The substrate is then immersed in hot pyrophosphoric acid (H₄P₂O₇) which may be contained, for example, in an open fused silica boat in a muffle furnace. In this embodiment, no effort need be made to isolate the room atmosphere from the furnace, and the actual media that acts to exchange Li ions for hydrogen ions in the exposed substrate is derived from the chemical reaction:

$$2H_3PO_4 \rightarrow H_2O + H_4P_2O_7 \quad (3)$$

Thus, the actual exchange medium is an equilibrium concentration of orthophosphoric acid, pyrophosphoric acid and water. Proton-exchange times run, depending on the waveguide being produced, from 7 to 25 minutes at a temperature of typically 230° C.

We have determined that waveguide depth varies in accordance with standard diffusion theory, i.e., as the square root of the diffusion time, when using the above-described fabrication method. We have used this fact to fabricate optimal structures as follows for use at a particular pump wavelength. Taking the information provided by eqn. (2) into account, we expect the power for second harmonic generation to be directly proportional to the pump power squared at a particular wavelength:

$$P_{second} = K(P_{pump})^2 \quad (4)$$

Thus, we can fabricate several waveguides, each being fabricated with a different diffusion time. The various diffusion times provide, in accordance with the above, different waveguide depths. Then Psecond can be plotted as a function of $(P_{pump})^2$ and examined for a maximum in accordance with the above-described analysis of the interference phenomenon. The depth at which a peak occurs is then used to fabricate the optimal waveguide structure and ensures that the interference effects are properly taken into account. In the fabrication process, the optimal waveguide depth is translated into a diffusion time.

Figure 3:
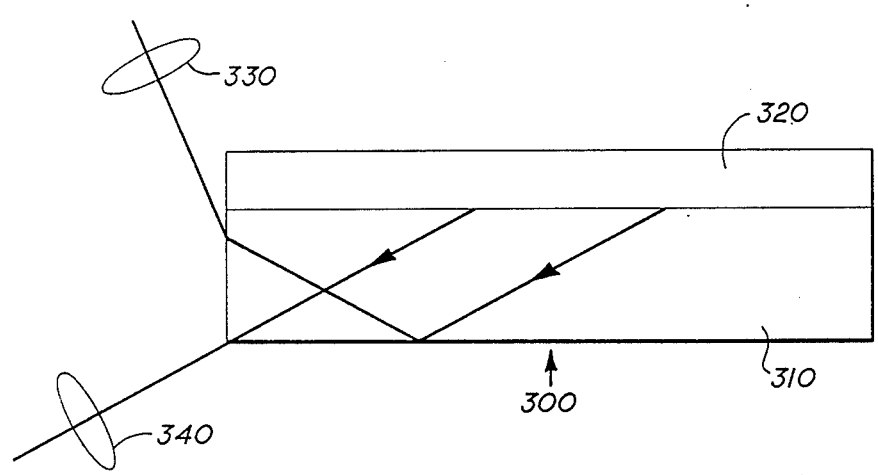
FIG. 3 shows, in pictorial form, a waveguide structure in which Cerenkov radiation is internally reflected from both surfaces of a substrate.

FIG. 3 shows, in pictorial form, a waveguide structure 300 which is configured so that sum frequency, including second harmonic, Cerenkov radiation at a particular wavelength is internally reflected from both the top and bottom surface of substrate 310. In FIG. 3, both sides of substrate 310 are polished, and waveguide 320 is fabricated so that the angle of the Cerenkov radiation exiting from waveguide 320 is small enough that internal reflection occurs from the bottom of substrate 320. Further, structure 300 is made sufficiently long that the reflected Cerenkov radiation emerges from structure 300 in an upwardly propagating direction. Then, by collecting the upwardly and downwardly propagating radiation with lenses 330 and 340, respectively, one obtains two beams of sum-frequency generated radiation.

Although most of the description set forth above referred to second harmonic generation, the present invention applies equally to sum-frequency generation by radiation from two or more laser sources. Because the nonlinear polarization giving rise to the two Cerenkov beams as shown in FIG. 2 will obey the same interference effects as shown there, namely waves 180 and 210 will interfer optimally constructively if the waveguide is chosen to be the precise guide depth for that particular sum-frequency generation. If not, they will interfer destructively or not optimally to give a reduced sum-frequency generation. For this reason, optimal waveguides for use in sum-frequency generation must be designed in accordance with the present invention to maximize the phase matching in Cerenkov radiation at the appropriate output wavelength. In addition, as described above with reference to eqn. (4), one can use a similar equation where the output power is proportional to the product of the power of the radiation from two lasers to determine an appropriate diffusion time for use in waveguide fabrication.

Still further, embodiments of the present invention can be used to provide optimal parametric up-converters. An up-converter being a special case of a sum frequency generator where sum-frequency generation is performed with a low power laser in conjunction with a second, and more powerful laser. As a result, the sum-frequency generated radiation will retain the "information" content of the lower power radiation.

Although most of the above described embodiments referred to proton-exchanged z-cut LiNbO$_3$ waveguides, the present invention also applies to ferroelectric waveguides in general. In particular, one may fabricate such waveguides from cuts of LiNbO$_3$ other than z-cut, from Ti diffused LiNbO$_3$ waveguides, from various cuts of LiTaO$_3$, from ZmS waveguides sputtered onto ZnO substrates, and from waveguides formed from the recently discovered nonlinear polymers disposed on suitable transparent substrate. In all of these cases, the waveguide fabrication, in accordance with the present invention, must take into account the interference effects of the sum-frequency or second harmonic generated Cerenkov radiation.

Although particular embodiments of the present invention have been shown and described herein, many varied embodiments incorporating the teachings of the present invention may be easily constructed by those skilled in the art.

What is claimed is:

1. An optical device for use in producing sum-frequency waves, including second harmonic waves, when laser light from at least one laser source is coupled thereinto, said optical device comprising:
   a substrate made of a ferroelectric material; and
   a channel waveguide formed in said substrate by either proton-exchange or in-diffusion of ions capable of raising the index of refraction of said substrate material in at least one azimuth, said channel waveguide having a width, depth, and effective index of refraction for propagating radiation of preselected wavelengths along the length of said channel waveguide in no more than two modes to maximize the power density of propagating radiation to generate sum-frequency, including second harmonic, Cerenkov radiation waves due to nonlinear interactions of propagating radiation, said sum-frequency radiation comprising one portion which radiates directly into said substrate and another portion that is directed into said substrate by total internal reflection at the top surface of said waveguide, a ratio of said preselected wavelengths to said depth of said channel waveguide being within the range between 0.4 and 0.55 so that said sum-frequency portions constructively interfer in phase with one another in said substrate so that said sum-frequency radiation is maximized.

2. The optical device of claim 1 wherein said substrate comprises lithium niobate.

3. The optical device of claim 2 wherein said waveguide is a proton-exchanged lithium niobate waveguide formed on the +z face of a z-cut lithium niobate substrate.

4. The optical device of claim 3 wherein said waveguide comprises a Ti diffused lithium niobate channel waveguide.

5. The optical device of claim 1 wherein said substrate comprises lithium tantalate.

6. The optical device of claim 1 wherein said waveguide comprises a proton-exchanged lithium tantalate channel waveguide.

7. The optical device of claim 1 wherein said waveguide comprises a Ti diffused lithium tantalate channel waveguide.

8. The optical device of claim 1 which further comprises at least one source of laser radiation and means for coupling radiation from said at least one source into said waveguide.

9. The optical device of claim 1 wherein said waveguide comprises ZnO and the substrate comprises ZnSe.

10. The optical device of claim 1 wherein said waveguide comprises a polymer having a nonlinear susceptibility and said substrate comprises fused silica.

11. A method for fabricating an optical device for use in producing sum-frequency waves in response to pumping with laser radiation of predetermined wavelengths where the device comprises a ferroelectric waveguide disposed on a substrate, said method comprising the steps of:
   fabricating on a ferroelectric substrate by ion diffusion or proton exchange several waveguides that will support at most two modes of radiation that propagate along the waveguides at preselected wavelengths, said waveguides having the same width and effective index of refraction but different depth, a ratio of said preselected wavelengths to said depth of said channel waveguide being within the range between 0.4 and 0.55,
   coupling laser radiation of the predetermined wavelengths into the waveguides to produce Cerenkov sum-frequency waves;
   measuring the intensity of the radiation coupled into the waveguides and the intensity of the sum-frequency waves produced;
   determining the waveguide depth for which a peak value of the intensity of the produced sum-frequency waves occurs as a function of waveguide depth; and
   fabricating at least one more waveguide in the material of the substrate at the depth having the peak response.

12. The method of claim 1 wherein the waveguide comprises a proton-exchanged waveguide fabricated on a LiNbO$_3$ substrate and the depth corresponds to a diffusion time for an ion-exchange process material at a predetermined temperature, the step of fabricating the waveguide having the depth at the peak value comprising diffusing the material for a diffusion time corresponding to the depth at the peak value.

* * * * *